WRITE MECHANISM FOR A THIN FILM MEMORY

Filed Aug. 4, 1966 2 Sheets-Sheet 1

INVENTORS
RODGER L. GAMBLIN
PHILIP A. LORD
BY Ronald J. Clark
ATTORNEY

March 10, 1970 R. L. GAMBLIN ET AL 3,500,349

WRITE MECHANISM FOR A THIN FILM MEMORY

Filed Aug. 4, 1966 2 Sheets-Sheet 2

United States Patent Office 3,500,349 Patented Mar. 10, 1970

3,500,349

WRITE MECHANISM FOR A THIN FILM MEMORY

Rodger L. Gamblin and Philip A. Lord, Vestal, N.Y., assignors to International Business Machines Corporation, Armonk, N.Y., a corporation of New York Filed Aug. 4, 1966, Ser. No. 570,369
Int. Cl. G11b *5/74*
U.S. Cl. 340—174 4 Claims

ABSTRACT OF THE DISCLOSURE

A thin film microwave absorption memory having a looped write line. The configuration of the write line is such that certain portions of the magnetization vectors cancel out and certain portions are reinforced. This is accomplished by full width land areas in the region of the storage position and connecting portions of substantially less width contacting alternate side sections of successive land areas.

This invention relates to thin film microwave absorption memories and, more particularly, to a novel write mechanism for use with a thin film microwave absorption memory employing a looped write line for cancelling out certain magnetization vectors and for re-enforcing other magnetization vectors. Furthermore, this write line employs full width land areas for defining a storage position and connecting portions of substantially less width for connecting successive land areas, which portions are connected to alternate side sections of successive land areas.

A microwave absorption thin film memory is disclosed by Rodger L. Gamblin in his copending application, Ser. No. 570,366 and assigned to the assignee of the present invention. The present write technique described in this application is adapted to be used in the above-described microwave absorption memory system.

In conventional read-out of a thin film memory, a hard axis field is applied to the thin film structure to be interrogated by passing a read current pulse down a read line oriented parallel to the easy axis of the film structure and normally placed atop or adjacent the thin film structure. This placement allows the coaction of the magnetic field generated by this read current, which field isorthogonal to the easy axis and thus parallel to the hard axis, with the stable magnetization vector of the thin film structure. This location results in a current coherent rotation of the magnetization vector into the hard axis direction. When the read pulse is relaxed, an output signal is sensed on a line positioned orthogonal to the read line. The polarity of this output depends upon the state of the film. A positive going signal is called a binary one and a negative going signal is called a binary zero. A word in such a system is defined along the easy axis direction of the film, since propagation of a current pulse down the read line and along the easy axis corresponds to individual magnetic fields generated along the hard axis of each thin film structure over which the read line extends. When data is written into a conventional thin film memory, a severe pulse is placed into all bits of a word along the read line resulting in a hard axis magnetic field rotating the stable magnetization vector into a potentially unstable position. Bit currents of a low magnitude are then supplied along bit lines of the memory, which lines are parallel to the read line. The resulting easy axis field further rotates the potentially unstable magnetization vector to a position where it will automatically assume a stable position equal to a binary one state when both pulses are removed. No pulse is applied to a bit line to write a binary zero into the thin film structure positioned at the intersection of that bit line and a read line. When the severe read pulse is relaxed, the rotated magnetization vector relaxes into its stable binary zero position.

In a microwave absorption memory the perturber pulse involved in the read-out of the memory elements creates a magnetic field along the easy axis since the current pulse propagates along the hard axis. Therefore, a word is defined in the hard axis direction of the memory elements. When data is written into the microwave absorption memory, the conventional method of write-in is not applicable since this conventional method, of necessity, defines a word along the easy axis direction. A proposed method of write-in for use with a microwave absorption memory, which memory is described in the aforementioned patent application, involves the application of a set of low-intensity pulses so that the hard axis of all bits which receive positive storage information is lightly pulsed. A positive perturber pulse is simultaneously supplied so that the bits with both an easy and hard axis field are put into the positive state. The complement hard axis bits are then driven and a negative perturber pulse then completes wirte-in for the word. The one disadvantage to this method is that two cycle times are required by the memory in order to perform the write-in operation. The second disadvantage is that the so-called "rotational" mode of write-in is employed. That is, a moderate hard and easy axis field are applied together. One disadvantage of this rotational mode of write-in is that it generally and slowly destroys the contents of the elements written into after a plurality of read-out operations. After approximately $10^4$ read-out operations a rewrite operation is required.

Accordingly, it is an object of the instant invention to provide a write mechanism for a thin film memory which requires only one cycle of machine time to perform the write-in operation.

It is another object of the instant invention to provide a write mechanism for a thin film memory which operates on principles whereby the rotational mode problem of conventional write-in techniques is eliminated.

It is a further object of the instant invention to provide a write mechanism for a thin film memory which utilizes a wiring arrangement which allows a hard axis field to propagate along the hard axis of an associated thin film structure and an easy axis field to propagate along the easy axis of an associated thin film structure.

It is a still further object of the instant invention to provide a write mechanism for a thin film memory which utilizes a wiring arrangement employing a plurality of lands and connecting portions connected to alternate sections of successive land areas.

It is a further object of the instant invention to provide a write mechanism for a microwave absorption device utilizing an overlapped write line having increased width portions crossing immediately above a continuous coupled hard axis film storage device to define a storage position.

According to these and other objects, the present invention contemplates the use of a thin film structure having a first stable magnetic state and a second stable magnetic state as a storage material and a microwave line as a means of determining the magnetic state of the thin film device. A first level of microwave energy is detected at the end of the microwave sense line when the thin film device is in one stable state, and a significantly different level of microwave energy is detected at the end of the microwave line when the thin film device is in the remaining stable state. The thin film structure is equipped with an easy axis write line or bit line of looped configuration comprising an upper leg and a lower leg. Each of these legs comprises a plurality of land areas. A pair of aligned land areas define a storage position. One land area of each pair is located on separate legs of the loop. Connecting links of substantially smaller width than the land areas are placed between successive land areas and connect the same side of successive lands together. However, the connecting link entering a land is on the opposite side than the connecting link leaving the same lead. A hard axis write line or word line is generally positioned transverse to the easy axis write lines. However, a portion of the hard axis write line is parallel to the easy axis write line, which parallel portion overlays the aligned land areas. A perturber read line is also generally positioned transverse to the easy axis write lines and is of sufficient width to overlay both the aligned land areas and that portion of the write line which overlays the aligned land areas. Suitable insulation between the various lines completes the thin film device.

The foregoing and other objects, features and advantages of the invention will be apparent from the following more particular description of a preferred embodiment of the invention, as illustrated in the accompanying drawings; wherein in the drawings.

Figures 1, 2:
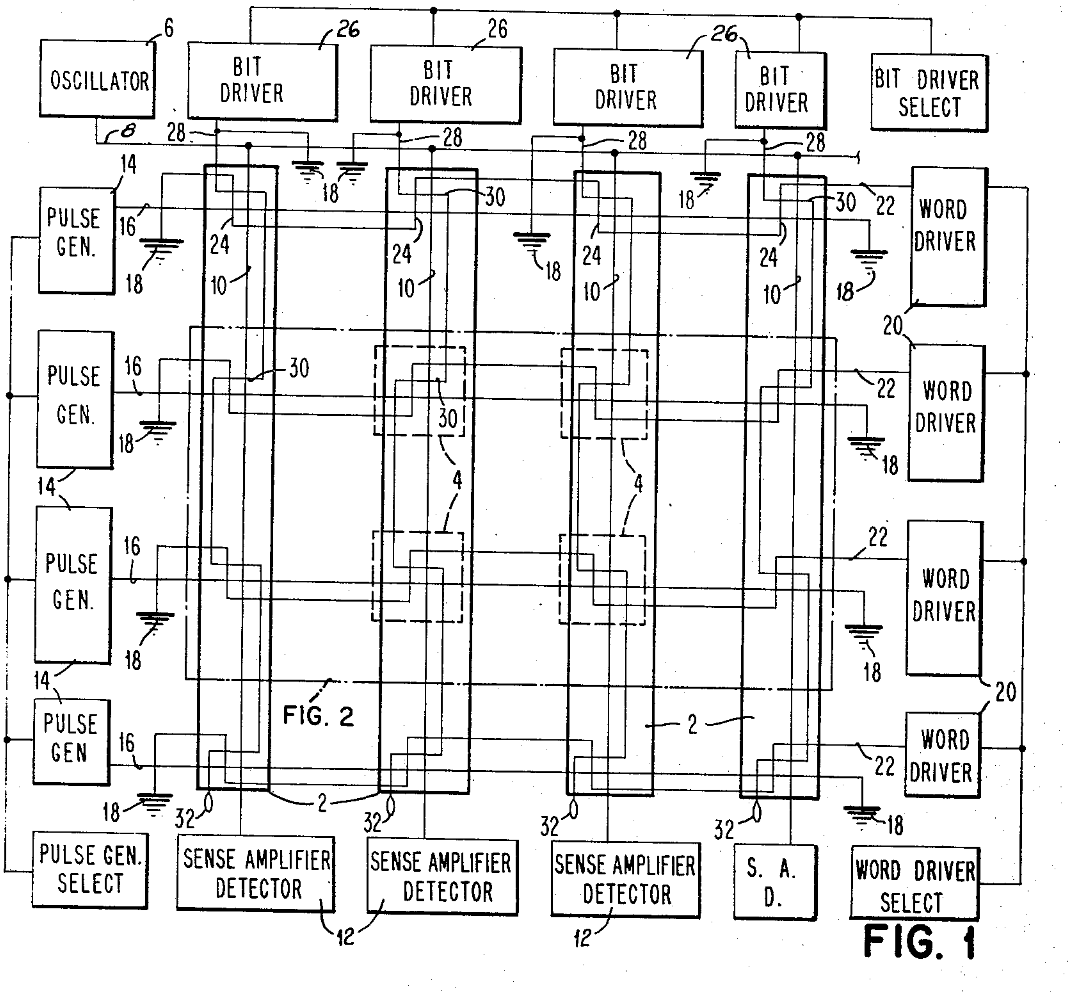
FIG. 1 is a schematic diagram of a two-dimensional memory matrix constructed according to the principles of the instant invention.
FIG. 2 is a partially broken plan view of a plurality of storage positions shown in FIG. 1 with details as to the plurality of write and read lines associated with the instant invention.
Figure 6:
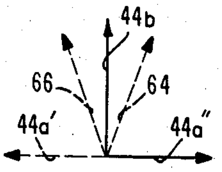
Figure 2:
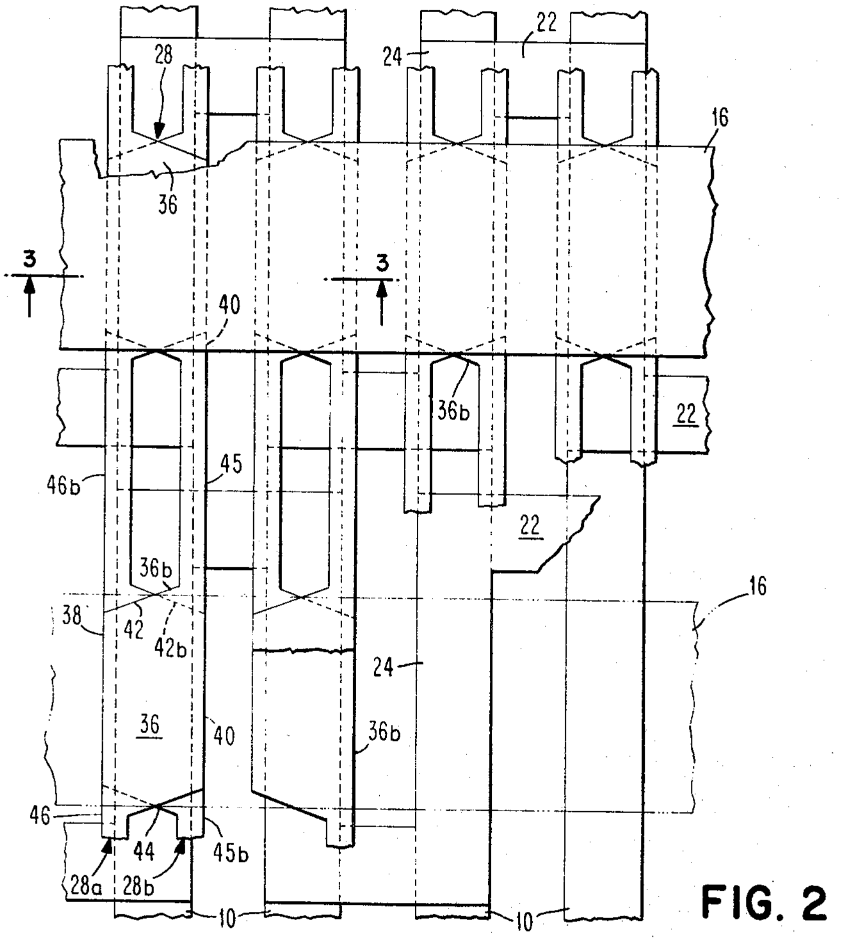
Figure 5A:
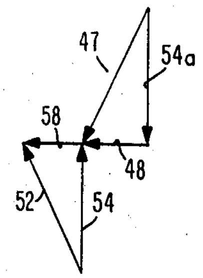
Figure 5B:
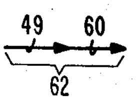

FIGS. 5*a* and 5*b* are schematic diagrams of the current and magnetization vectors coacting around the land areas shown in FIG. 2; and FIG. 6 demonstrates the read and write techniques employed in the instant invention.

Referring to FIG. 1, there is shown a schematic view of the two-dimensional memory constructed according to the principles of the instant invention. A plurality of thin film structures 2 are present as continuous surfaces over which the remaining plurality of lines are positioned. A plurality of storage positions such as 4 are defined on the surface of one of the structures 2 by the intersection of the lines hereinafter described. An oscillator 6 generates a microwave signal at a selected frequency of seven hundred megacycles per second. This frequency can be selected from the range of frequency extending from five hundred-fifty to nine hundred-fifty megacycles. A transmission line 8 conveys the microwave signal generated by the source 6 to a plurality of branch sense lines 10. Standard techniques are employed to divide the microwave signal equally among the branch lines 10. Each branch line 10 terminates in a corresponding detector and sense amplifier circuit 12. A plurality of pulse generator circuits 14 furnish perturber pulses to an equal plurality of perturber lines 16 respectively. A suitable pulse generator 14 may be selected from among the prior art devices. The generator 14 selected for use in the present preferred embodiment provides a two hundred milliampere pulse of twenty milliwatts into its corresponding perturber line 16. The perturber lines 16 are placed orthogonally to the plurality of branch lines 10 and are terminated in a ground 18.

A plurality of hard axis word drivers 20 provide a partial switching current to an equal number of drive lines 22 respectively. The drivers 20 are of standard design and may assume many configurations with varying operating characteristics depending on the design of the memory. A preferred driver circuit generates a fifty nanosecond drive pulse at two hundred milliamperes. The hard axis word drive lines 22 extend in a general transverse manner across the plurality of branch lines 10. However, each line 22 comprises a plurality of segments 24, one of which extends parallel to its respective line 10. Each of the hard axis word driver lines 22 terminates in a ground sink 18. The currents in successive segments flow in opposite directions.

A plurality of easy axis bit driver circuits 26 supply a bit pulse of lesser intensity than the word drive pulse to an equal plurality of easy axis bit lines 28. A suitable bit driver circuit can be of standard design and can supply a fifty nanosecond pulse at forty milliamperes to its respective bit line 28 respectively. The bit drive lines 28 extend in a generally parallel manner over the branch lines 10. Each of the write driver lines 28 comprises a plurality of sections 30, one of which is shown parallel to each perturber line 16 over which the bit line crosses. Successive sections 30 on each of the easy axis write lines 28 have currents flowing in opposite directions. These sections are schematic representations of the magnetization vector addition and cancellation described in greater detail with reference to FIG. 2. Each of the bit lines 28 loop back upon themselves as represented by the looped portion 32 on each of the easy axis write driver lines 28. The termination of the overlay portion of each easy axis bit line 28 is in ground 18.

Greater detail of the sense lines 10, perturber lines 16, word lines 22 and bit lines 28 employed in the instant invention is shown in the break away plan view of FIG. 2. The plurality of branch sense lines 10 are shown as the basic element upon which all other lines are oriented and aligned. The thin film structure 2 is shown in cross section in FIG. 4, and the easy axis of the film is represented in FIG. 6 by an arrow **44*a* and the hard axis of the structure is represented by an arrow 44*b*. These axes are established during the construction of the film structure 2. The hard axis word lines 22 are shown having their segments 24 parallel to one of the branch lines 10. The hard axis word driver lines 22 are shown extending generally in a left to right direction across FIG. 2. The word drive lines 22 and their integral segments 24 are of uniform width and thickness. These dimensions may vary over a wide range but a suitable width is five to ten thousandths of an inch and a suitable thickness is one to two thousandths of an inch. The easy axis bit lines 28 are shown in greater detail and are of looped configuration. More specifically, each driver line 28 comprises an upper leg 28*a* and a lower leg 28*b*. Each of the legs 28*a* comprises a plurality of the lands 36 of generally rectangular shape and intervening connecting links of substantially less width than the land areas. The embodiment shown employs a land area 36 in the shape of a parallelogram. The land 36 has generally parallel sides 38 and 40 which are of substantially the same length, but which are not coextensive to each other and which extend beyond each other in such a manner that an upper edge 42 and a lower edge 44 may be drawn parallel to each other forming a parallelogram. An entering connecting link 45 between adjacent land enters the parallelogram on one side; for example, the side 40, and the connecting link 46 with the next successively placed land exits the land 36 from the opposite side for example the side 38. The connecting links 45 and 46 are of considerably less width than the lands 36 in order to generate a vector having a transverse component 48** as described herein after with respect to FIG. 5*a*. In this configuration the current flowing, for example from the top of the figure in FIG. 2 towards the bottom on the same figure, creates a vector represented by an arrow 47 in FIG. 5*a*. The current is flowing in the direction represented by the arrowhead. The vector 47 can be divided into many components, one of which is a vector represented by an arrow 48, which generates a magnetic field having a vector represented by an arrow 49. When the easy axis write line reaches the end of the matrix array, it is looped back upon itself and includes an additional plurality of lands **36*b* which are generally aligned with each other except for those portions of a parallelogram which would naturally extend beyond an oppositely sloped parallelogram. The lines, land sides and links of the lower leg 28*b*** are identified by the same numerals plus a character *b*. The lower land area **36*b* is represented partially by dotted lines for those portions which overlap the above-positioned parallelogram. The entering link of the lower leg is shown at 45*b* and the exit link is shown at 46*b***. In this manner a current vector representing the current flowing from the bottom of the figure towards the top of the figure is shown in FIG. 5*a* by an arrow 52. This vector has a component 54 which effectively cancels an equal but opposite component **54*a* of the current flowing in the upper leg 28*a*. The remaining component 58 effectively adds with the component 48 of the current vector flowing in the upper leg 28*a*. The current vector 58 generates a magnetic vector 60, which adds to the vector 49 and results in a field represented by an arrow 62 suitable for rotating the magnetization vector of the structure 2 to a potentially unstable magnetic state. The current flowing in the sections 24 of the hard axis drive lines 22 now provides a magnetic component sufficient to switch the magnetic vector of the storage area 4 located under the lands 36 to a position from which the vector will move to a stable state once the write currents on the lines 28 and 22** are removed.

The write mechanism is further described with reference to FIG. 6. The magnetization of the structure lies in a position **44*a*″ when it represents a binary one and it lies in a position 44*a*′ when it represents a binary zero. The magnetic field represented by the vector 62 moves the vectors 44*a*″ or 44*a*′ to their respective new positions 64 and 66. The magnetic vector generated in response to the current flowing through the drive lines 22 causes the vectors 64 and 66 to interchange their positions; and when both currents are removed, the vectors 64 and 66 move toward their stable positions 44*a*″ and 44*a*′** respectively. When the vector is already in the stable state into which the applied currents are attempting to place it, no significant moving of vectors occurs.

The plurality of perturber lines 16 are placed atop the aforementioned easy axis write lines and hard axis write lines. The perturber line is extended generally transverse to the plurality of branch lines 10 and of sufficient width to overlay that portion of both land areas on the upper and lower legs which overlay each other. This geometry is employed in order to give maximum coupling for the size of the wire employed.

Figure 3:
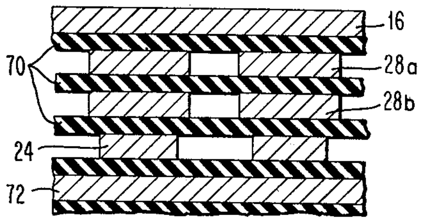
FIG. 3 is a partial sectional view taken along the lines 3—3 in FIG. 2 showing the read and write lines associated with the instant invention.

Referring to FIG. 3, there can be seen a partial section taken on the line 3—3 of FIG. 2 wherein the order of the placement of lines upon the thin film structure 2 is shown. Between each of the next mentioned drive lines and other active elements there is a suitable layer of insulation 70. The lowest active element is an RF shield 72 which is constructed of quarter-ounce copper and provides a shield of several skin depths for the RF signal, but less than one skin depth for the perturber signal. The section 24 of the write line 22 is next above the RF shield followed by the lower leg of the easy axis write line **28*b*. Above the lower leg is the upper leg 28*a*. The uppermost line is the perturber line 16**.

Figure 4:
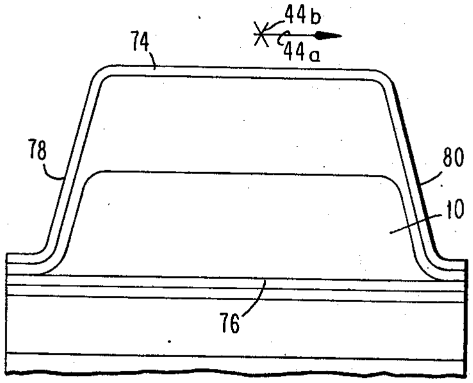
FIG. 4 is a cross-sectional view of the thin film structure and the sense line employed in the present invention.

Referring to FIG. 4, there can be seen an enlarged view of a cross section of the thin film structure and its internally placed word line 10. The thin film structure has an upper portion 74, a lower portion 76, a first connecting piece 78, and a second connecting piece 80. The upper-lower and connecting pieces formed a coupled hard axis structure. Although the connecting pieces are integral with the upper piece 74, they are separated a slight distance from the lower piece 76. However, this is immaterial since the gap thus formed is measured in microns and only exists because of the difficulty in forming a complete and integral member because of difficulties in present-day deposition techniques. The arrow **44*a* represents the hard axis and the arrow 44*b*** represents the easy axis.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In combination, a coupled hard axis thin film structure having an easy axis and a substantially closed hard axis and said structure having a first stable state characterized by a first magnetization vector oriented parallel to said hard axis and having a second stable state characterized by a second magnetization vector oriented parallel but opposite to said first vector, a first drive line positioned on one side of said thin film structure, said first line having an upper leg and a lower leg and each of said legs being formed with a plurality of land areas, each of said land areas in said upper leg being aligned with a corresponding land area in said lower leg, each of said areas having a first side and a second side, a plurality of connecting link members, one of which connects corresponding first sides of successive land areas and successive links being positioned on alternate sides of each land, means connected to said first line for applying a current pulse down said first line, and said current flowing angularly through each of said land areas from one of said connecting links to said next successive connecting link and said current having an easy axis component and a hard axis component; and said easy axis component in each of said lands in said upper leg being cancelled by said easy axis component in each of said lands in said lower leg and said hard axis component in each of said lands in said upper leg being reinforced by said hard axis component in each of said lands in said lower leg.

2. A write mechanism as recited in claim 1, wherein: said lands are substantially rectangular in shape; and said current flows diagonally through each of said land areas.

3. A write mechanism as recited in claim 1 and further including, a second line having an integral section superimposed over said pairs of aligned land areas and extending parallel to said easy axis; and a second current means connected to said second line for applying a current pulse down said second line.

4. In combination, a plurality of elongated coupled hard axis thin film structures having an easy axis and a substantially closed hard axis and said structure having a first stable state characterized by a first magnetization vector oriented parallel to said hard axis and having a second stable state characterized by a second magnetization vector oriented parallel but opposite to said first vector, said structure being positioned in side-by-side relationship and slightly separated from each other, a plurality of first lines and each of said first lines being positioned on one side of its associated thin film structure and having an upper leg and a lower leg and each of said legs being formed with a plurality of land areas, each of said land areas in said upper leg being aligned with a corresponding land area in said lower leg, each of said areas having a first side and a second side, a plurality of connecting link members one of which connects corresponding first sides of successive land areas and successive links being positioned on alternate sides of each land area, means connected to said first lines for applying a current pulse down a selected first line and said current flowing diagonally through each of said land areas and said current having an easy axis component and a hard axis component, said easy axis component in each of said lands in said upper leg being cancelled by said easy axis component in corresponding lands in said lower leg and said hard axis component in each of said lands in said upper leg being reinforced by said hard axis component in each of said lands in said lower leg, a plurality of second lines and each of said lines extending generally transverse to said structures and having a plurality of sections superimposed over pairs of aligned land areas and each of said sections extending parallel to said easy axis; and a second current means connected to said second lines for driving a current pulse down one of said second lines, said current flow in adjacent sections being antiparallel to each other.

References Cited

UNITED STATES PATENTS

| | | | |
|---|---|---|---|
| 3,391,397 | 7/1968 | Birt et al. | 340—174 |
| 3,375,503 | 3/1968 | Bertelsen | 340—174 |
| 3,286,242 | 11/1966 | Gianola | 340—174 |
| 3,223,985 | 12/1965 | Bittmann et al. | 340—174 |
| 3,023,402 | 2/1962 | Bittmann | 340—174 |

JAMES W. MOFFITT, Primary Examiner